(12) United States Patent
Choi

(10) Patent No.: US 8,018,523 B2
(45) Date of Patent: Sep. 13, 2011

(54) IMAGING OPTICAL SYSTEM FOR IMAGE SENSOR

(75) Inventor: Byung-ha Choi, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 386 days.

(21) Appl. No.: 12/408,895

(22) Filed: Mar. 23, 2009

(65) Prior Publication Data

US 2009/0284639 A1 Nov. 19, 2009

(30) Foreign Application Priority Data

May 13, 2008 (KR) .................. 10-2008-0044025
Aug. 22, 2008 (KR) .................. 10-2008-0082370

(51) Int. Cl.
*H04N 5/225* (2006.01)
*G02B 13/18* (2006.01)

(52) U.S. Cl. ......... 348/340; 348/342; 359/718; 359/722

(58) Field of Classification Search .................. 348/340, 348/342; 359/718, 719, 722
See application file for complete search history.

(56) References Cited

U.S. PATENT DOCUMENTS

| | | | | |
|---|---|---|---|---|
| 6,671,105 B2 * | 12/2003 | Saito | .............. | 359/719 |
| 6,888,687 B2 * | 5/2005 | Ninomiya et al. | ............ | 359/718 |
| 6,985,184 B2 * | 1/2006 | Sato | .............. | 348/340 |
| 6,995,928 B2 * | 2/2006 | Saito | .............. | 359/718 |
| 7,440,197 B2 * | 10/2008 | Ishizuka | ...................... | 359/708 |
| 7,916,402 B2 * | 3/2011 | Choi | .............. | 359/719 |

* cited by examiner

*Primary Examiner* — W. B. Perkey
(74) *Attorney, Agent, or Firm* — Drinker Biddle & Reath LLP

(57) ABSTRACT

Provided is a imaging optical system for an image sensor. The imaging optical system includes a stop and a first lens sequentially arranged from an object side. The first lens has aspherical surfaces on both sides and has a positive refractive power, a first surface of the first lens which faces the object side is a convex surface and a second surface of the first lens which faces an image side is a convex surface.

6 Claims, 16 Drawing Sheets

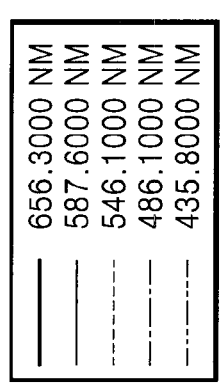
FIG. 2
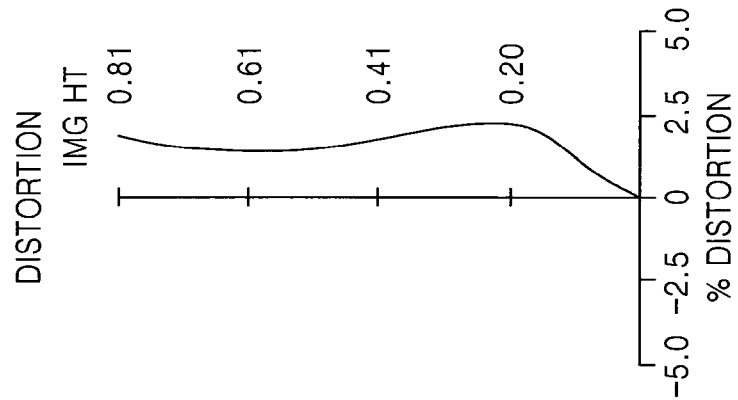
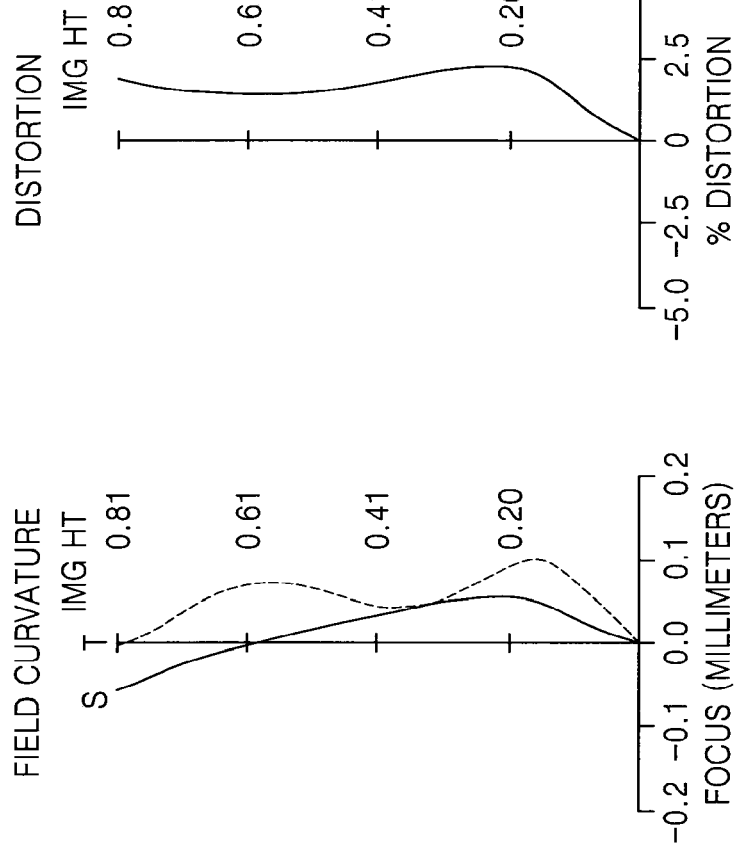
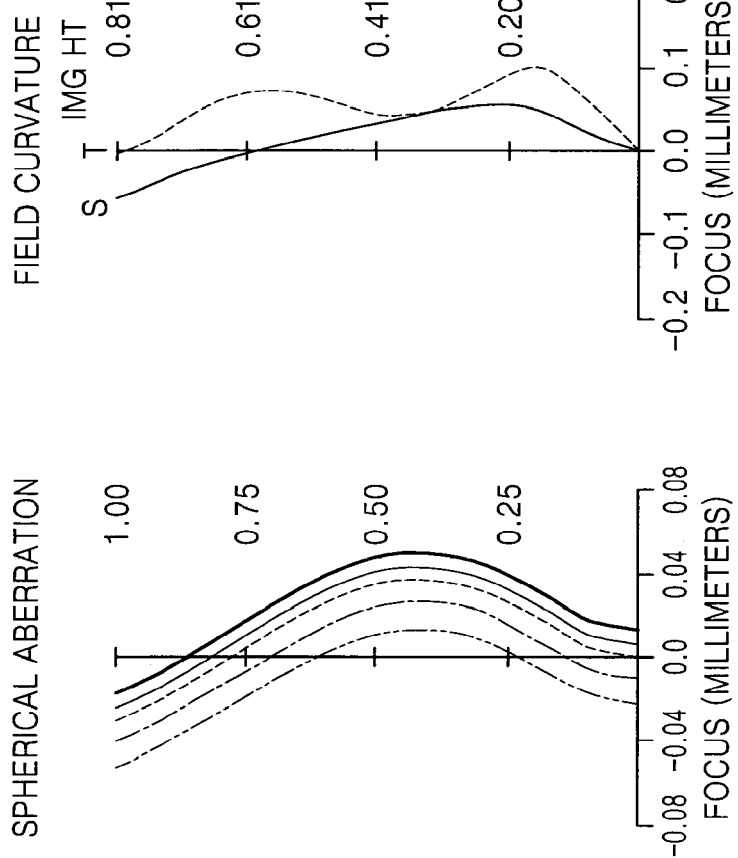

ИМАGING OPTICAL SYSTEM FOR IMAGE SENSOR

CROSS-REFERENCE TO RELATED PATENT APPLICATIONS

This application claims the benefit of Korean Patent Application No. 10-2008-0044025, filed on May 13, 2008, and Korean Patent Application No. 10-2008-0082370, filed on Aug. 22, 2008, in the Korean Intellectual Property Office, the disclosures of which are incorporated herein by reference.

BACKGROUND OF THE INVENTION

1. Field of the Invention

The present invention relates to a small, light, and inexpensive imaging optical system for an image sensor.

2. Description of the Related Art

Recently, the use of digital cameras or video cameras including a solid state pickup device such as a charge coupled device (CCD) or a complementary metal-oxide semiconductor (CMOS) has considerably increased. In particular, camera modules offering high megapixel resolution are required in many applications. Manufacturers are always searching for ways to make smaller and lighter digital cameras that can be manufactured at law cost. Thus, an imaging optical system including a single lens is generally used.

Because of the infrared sensitivity of CCD and CMOS devices, an (IR) cut-off filter is generally used between a lens and an image sensor in a filter and lens combination. IR cut-off filters are usually fabricated by coating a piece of flat glass about 30-40 times with an IR cut-off material. Unfortunately, when this kind of IR cut-off filter is combined with a lens, the spectral characteristics of an image formed changes dramatically according to the angle at which light is incident to the lens and filter combination. In other words, light transmittance decreases much faster as the incident angle increases than it would through a lens without a separate IR cut-off filter. IR cut-off filters thus present disadvantages in terms of light transmittance.

Chromatic aberration presents another problem for a conventional lens and IR cut-off filter combination. In many devices, the incident angle of a principal ray can be up to 25° and still be incident on an image sensor. Since there are differences between the transmittances and the spectral characteristics of a center portion of the filter and lens combination and a peripheral portion of the filter and lens combination, large chromatic aberrations are generated. In addition, Moire patterns tend to form on conventional IR cut-off filters, further degrading image quality.

These disadvantages are compounded by the difficulty of manufacturing a lens and IR cut-off filter using lower cost reflow processes. In a reflow process of manufacturing, a camera module is attached onto a printed circuit board (PCB) by melting a solder cream applied to the surface of the PCB. Reflow process manufacturing has been widely used recently because the process of coupling the camera module to the PCB can be simplified, with yield for the process of manufacturing camera modules thereby greatly improved. Demands for developing reflowable camera modules have continuously increased, but the conventional lens and IR cut-off filter combination remains difficult to make in a reflow process.

SUMMARY OF THE INVENTION

The present invention provides an imaging optical system having a small size and low chromatic aberration.

The present invention also provides a imaging optical system suitable for a reflowable camera module.

According to an aspect of the present invention, there is provided an imaging optical system for an image sensor, the imaging optical system including: a stop and a first lens sequentially arranged from an object side, wherein the first lens has aspherical surfaces on both sides and has a positive refractive power, a first surface of the first lens which faces the object side is a convex surface and a second surface of the first lens which faces an image side is a convex surface, and the imaging optical system satisfies the following inequality, $$1.0 < C_T/E_T < 1.4,$$

where $C_T$ denotes a thickness of the first lens on a center portion of the first lens, and $E_T$ denotes a thickness of the first lens on an edge portion of an effective aperture of the first lens.

The following inequalities may be satisfied:

$$1.1 < L_B/f < 1.5$$

$$1.0 < L_T/L_B < 1.4,$$

where $L_T$ represents a distance along an optical axis from a surface of the stop facing the object side to an image surface, f represents an entire focal distance of the focusing optics, and $L_B$ represents a distance along the optical axis from the first surface to the image surface.

The following inequality may be satisfied:

$$0.18 \leq S \leq 0.3,$$

where S denotes a distance of the optical axis from the stop to the first surface of the first lens.

The following inequality may be satisfied:

$$0.5 < \frac{|R_1|}{f} < 0.9,$$

where $R_1$ denotes a curvature of the first surface of the first lens, and f denotes the entire focal distance of the focusing optics.

The following inequality may be satisfied:

$$0.35 < C_T/f < 0.57,$$

where $C_T$ denotes a thickness of a center portion of the first lens, and f denotes the entire focal distance of the focusing optics.

The first lens may be formed from a glass having an infrared-ray cut function.

BRIEF DESCRIPTION OF THE DRAWINGS

The above and other features and advantages of the present invention will become more apparent by describing in detail exemplary embodiments thereof with reference to the attached drawings in which:

FIG. 2 is a diagram showing a spherical aberration, a field curvature, and a distortion aberration of the imaging optical system shown in FIG. 1;

DETAILED DESCRIPTION OF THE INVENTION

Hereinafter, a imaging optical system according to embodiments of the present invention will be described with reference to accompanying drawings.

Figure 1:
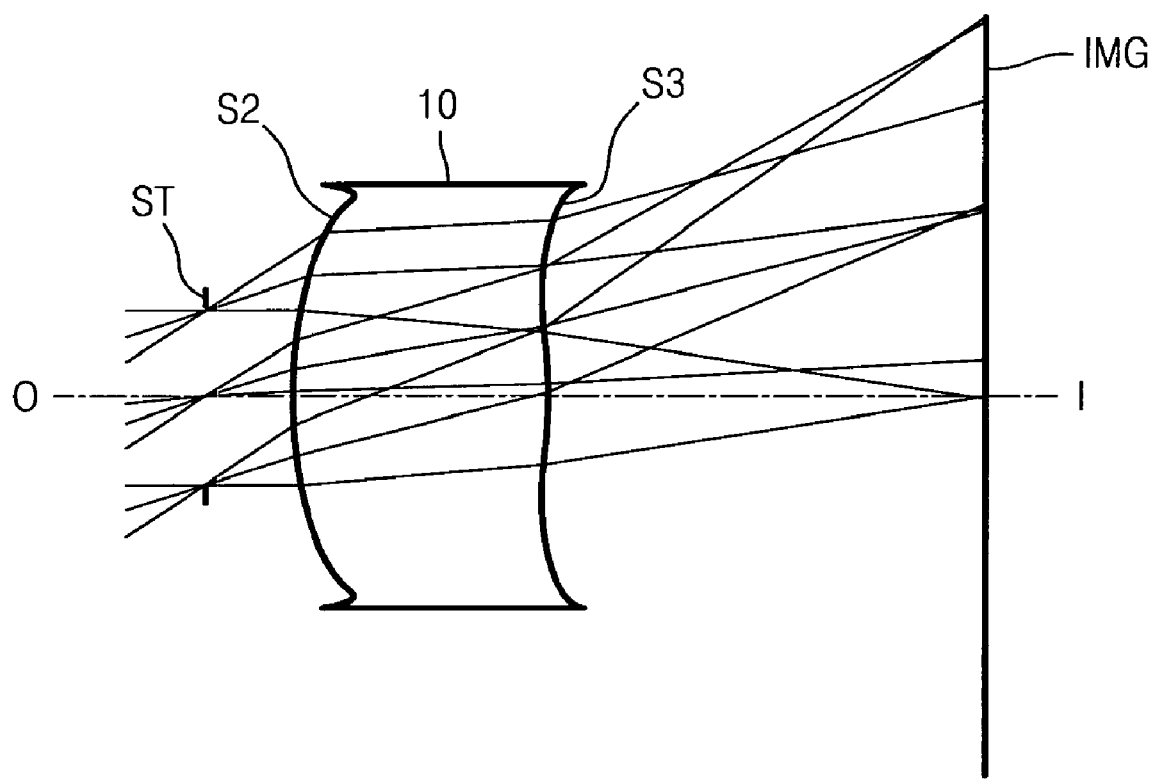
FIG. 1 is a diagram showing an imaging optical system for an image sensor according to an embodiment of the present invention.

FIG. 1 shows a imaging optical system according to an embodiment of the present invention. Referring to FIG. 1, the imaging optical system of the present embodiment includes a stop (ST) and a first lens 10 arranged from a side of an object side O. The first lens 10 has a positive refractive power and aspherical surfaces. In addition, the first lens 10 has a first surface S2 toward the object side O and a second surface S3 toward an image side I, which are both convex. That is, the first surface S2 is convex toward the object side O, and the second surface S3 is convex toward the image side I. When the first lens 10 is formed to have convex surfaces on both sides thereof, image distortion can be reduced.

In contrast with the prior art, according to the present invention, an IR cut-off filter is not provided separately on an image side I of the first lens 10. According to the present invention, the first lens 10 is fabricated from a glass having an IR absorption property so that the first lens 10 can be fabricated using a reflow process. Since the first lens 10 itself performs as an IR cut-off filter, an additional IR cut-off filter is not required, and thus, the fabrication costs can be reduced. In addition, since the first lens 10 is fabricated using the glass, a camera module including the first lens 10 can be coupled to a product using a reflow method. Therefore, the imaging optical system according to the present invention is suitable for small cameras mounted in mobile devices, such as mobile phones, personal digital assistances (PDAs), or video telephony call cameras.

Demands for reducing the size of imaging devices such as CCD or CMOS, and electronic devices including such imaging devices have increased. Conventional video telephony call cameras include a plastic aspherical lens. As the use of camera modules having excellent thermal properties that can be fabricated using simple reflow processes has increased, however, wafer level lenses or aspherical glass lenses have been developed. Plastic aspherical lenses are not suitable for reflowable camera modules because plastic often deforms at high temperature. Thus, in an embodiment of the present invention, the first lens 10 is fabricated from using IR absorbing glass, eliminating the need for a separate IR cut-off filter, and reducing the cost, size, and weight of the entire lens assembly.

In an embodiment, the present invention reduces the overall size of the lens assembly by reducing the back focal distance of the assembly. When (as in a conventional lens and IR-cut-off filter combination) an IR cut-off filter is disposed between the first lens and the image, a long back focal distance must be ensured. Since the imaging optical system of the present invention does not require the additional IR cut-off filter, however, the back focal length can be reduced.

Beyond a reduction in the size of the lens assembly, the present invention presents an improvement in the transmittance and chromatic aberration of the lens assembly. Since the first lens 10 is fabricated using the IR cut-off glass, transmittance and spectral characteristics of the first lens 10 do not vary with the incident angle of light. Brightness deviation and chromatic aberration are far less significant problems for image quality.

In an embodiment, the imaging optical system according to the present embodiment satisfies the following inequality (1).

$$1.0 < C_T/E_T < 1.3 \qquad (1)$$

where $C_T$ denotes a thickness of a center portion of the first lens 10, and $E_T$ denotes a thickness of an edge portion in an effective aperture of the first lens 10.

The thickness of the center portion is a thickness of a portion of the lens through which an optical axis passes, and the thickness of the edge portion is a thickness of a portion of the lens at which the effective aperture ends. In the IR cut-off glass, an IR cut-off wavelength is changed according to the thickness of the glass. Therefore, when the first lens 10 does not satisfy the above inequality 1, a deviation of the IR cut-off wavelength band increases, and thus, a color deviation on the center portion of the first lens 10 and the peripheral portion of the first lens 10 may be generated.

In addition, the imaging optical system according to the present embodiment satisfies the following inequalities (2) and (3).

$$1.1 < L_B/f < 1.5 \qquad (2)$$

$$1.0 < L_T/L_B < 1.4 \qquad (3)$$

where $L_T$ represents a distance along an optical axis from a surface of the stop facing the object side O to an image surface (IMG), f represents the entire focal distance of the imaging optical system, and $L_B$ represents a distance along the optical axis from the first surface S2 to the image surface IMG. In the present invention, the image surface IMG can be substituted by an image sensor surface. The above inequality 2 is provided to ensure a viewing angle suitable for a video telephony call, and the inequality 3 is provided to reduce the size of the imaging optical system. That is, when a value of $L_T/L_B$ is greater than 1.3, a height of the focusing optics increases and the stop becomes wider, and thus, inner reflection of the light may be weakened. When the value of $L_T/L_B$ is less than 1, a telecentric property may be degraded and curvature may increase.

Meanwhile, the imaging optical system of the present embodiment can be formed to satisfy the following inequality (4).

$$0.18 \leq S \leq 0.3 \quad (4)$$

where S represents a distance along the optical axis from the stop to the first surface S2 of the first lens 10. According to the inequality 4, when S is greater than 0.2, it is difficult to reduce the size of the imaging optical system because the entire imaging optical system becomes thick even though the telecentric property can be ensured. In addition, the stop is too far from the first lens 10, and thus, the inner reflection of the light becomes weak. On the other hand, when S is less than 0.18, it is difficult to ensure the telecentric property, and generation of the field curvature increases.

The following inequality is provided to ensure the viewing angle suitable for a video telephony call and to improve resolution power of the imaging optical system.

$$0.5 < \frac{|R_1|}{f} < 0.9 \quad (5)$$

where $R_1$ denotes a curvature of the first lens 10, and f denotes the entire focal distance of the focusing optics. When a value of $R_1/f$ is less than 0.5, it is difficult to form the first lens 10, and when the value of $R_1/f$ is greater than 0.9, it is difficult to satisfy optical performances of the first lens 10.

The following inequality defines the thickness of the first lens 10 in order to improve yield of the process of manufacturing the imaging optical system.

$$0.35 < C_T/f < 0.57 \quad (6)$$

where $C_T$ denotes a center thickness of the first lens 10, and f denotes the entire focal distance of the imaging optical system. The above inequality 6 is provided to improve the yield of the process of manufacturing the imaging optical system by restricting the increase of the thickness of the first lens 10.

On the other hand, the aspherical surface according to the embodiments of the present invention can be defined as follows.

The aspherical shape of the first lens 10 according to the present embodiment can be represented by the following equation when the optical axis direction is the x-axis, a direction perpendicular to the optical axis is the y-axis, and the proceeding direction of a ray is the positive direction. Here, x denotes a distance along the optical axis direction from a vertex of the first lens 10, y denotes a distance in the direction perpendicular to the optical axis, K denotes a conic constant, A, B, C, D, E, F, G, and H denote deformation terms, and c denotes an inverse number of a radius of curvature (1/R) on the vertex of the first lens 10.

$$x = \frac{cy^2}{1 + \sqrt{1 - (K+1)c^2h^2}} + Ah^4 + Bh^6 + Ch^8 + Dh^{10} + Eh^{12} + Fh^{14} + Gh^{16} + Hh^{18} \quad (7)$$

The present invention includes lenses realizing small-sized lenses through the various embodiments as follows.

Hereinafter, f denotes a combined focal length of the entire lens system, Fno denotes a number of F, 2ω denotes the viewing angle, R denotes the radius of curvature, Dn denotes the central thickness of the first lens 10 or a distance between neighboring lenses, and vd denotes the Abbe number. In addition, ST denotes the stop, OBJ denotes an object surface, IMG denotes the image surface, and ASP denotes the aspherical surface.

First Embodiment

FIG. 1 shows a imaging optical system according to the first embodiment.

| f: 1.26 Fno: 3.2 ω: 32.56 | | | |
|---|---|---|---|
| R | Dn | nd | vd |
| OBJ: INFINITY | INFINITY | | |
| ST: INFINITY | 0.195000 | | |
| S2: 1.00000 | 0.560000 | 1.633 | 50.3 |
| ASP: | | | |
| K: 2.191907 | | | |
| A: 0.643524E+00 | B: 0.117310E+02 | C: −.447364E+03 | |
| D: 0.490994E+04 | E: −.546912E+04 | F: −.266199E+06 | |
| G: 0.144047E+07 | H: 0.787653E+06 | J: −.125880E+08 | |
| S3: −3.15579 | 0.299811 | | |
| ASP: | | | |
| K: −4045.049088 | | | |
| A: −.125363E+01 | B: 0.420788E+02 | C: −.339024E+03 | |
| D: 0.828909E+03 | E: 0.467456E+04 | F: −.831814E+04 | |
| G: −.178741E+06 | H: 0.544354E+06 | J: 0.317769E+06 | |
| S4: INFINITY | 0.300017 | | |
| S5: INFINITY | 0.385735 | | |
| IMG: INFINITY | 0.000000 | | |

In above data, S4 and S5 denote air gaps. FIG. 2 shows a spherical aberration, a field curvature, and a distortion of the imaging optical system according to the first embodiment of the present invention. The spherical aberration is measured with respect to C_line, e-line, and F-line. C_line is 656.3 nm, e-line is 546 nm, and F-line is 486.1 nm. As the field curvature, a tangential field curvature (T) and a sagittal field curvature (S) are shown.

Second Embodiment

Figure 3:
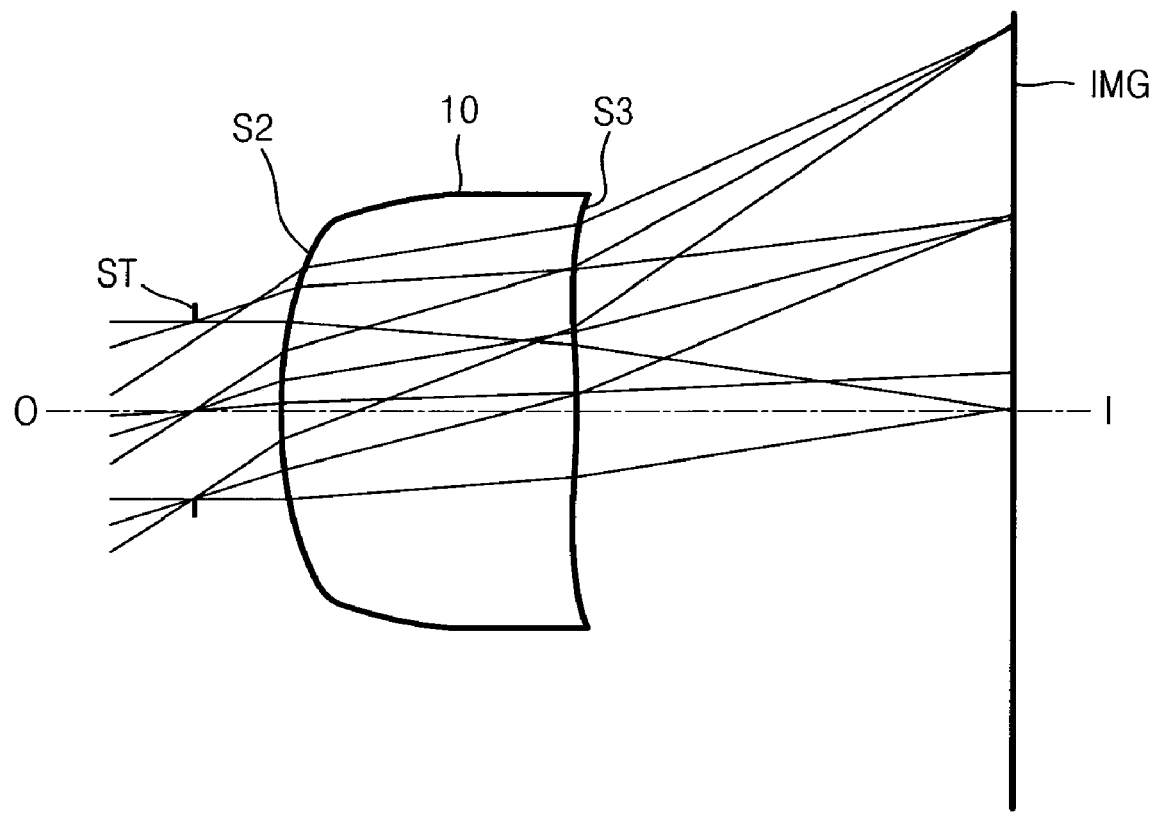
FIG. 3 is a diagram showing an imaging optical system for an image sensor according to another embodiment of the present invention.

FIG. 3 shows a imaging optical system according to a second embodiment of the present invention.

| f: 1.26 Fno: 3.2 ω: 32.63 | | | |
|---|---|---|---|
| R | Dn | nd | vd |
| OB: INFINITY | INFINITY | | |
| ST: INFINITY | 0.195000 | | |
| S2: 1.00357 | 0.638952 | 1.633 | 50.3 |
| ASP: | | | |
| K: −0.532900 | | | |
| A: 0.107903E+00 | B: 0.296528E+02 | C: −.679410E+03 | |
| D: 0.629045E+04 | E: −.285691E+04 | F: −.324820E+06 | |
| G: 0.145024E+07 | H: 0.178514E+07 | J: −.125880E+08 | |
| S3: −3.11427 | 0.299792 | | |
| ASP: | | | |
| K: −2626.799076 | | | |
| A: −.194333E+01 | B: 0.474362E+02 | C: −.366073E+03 | |
| D: 0.904787E+03 | E: 0.348703E+04 | F: −.682097E+04 | |
| G: −.127166E+06 | H: 0.493206E+06 | J: −.391541E+06 | |
| S4: INFINITY | 0.299998 | | |
| S5: INFINITY | 0.355876 | | |
| IMG: INFINITY | 0.000000 | | |

Figure 4:
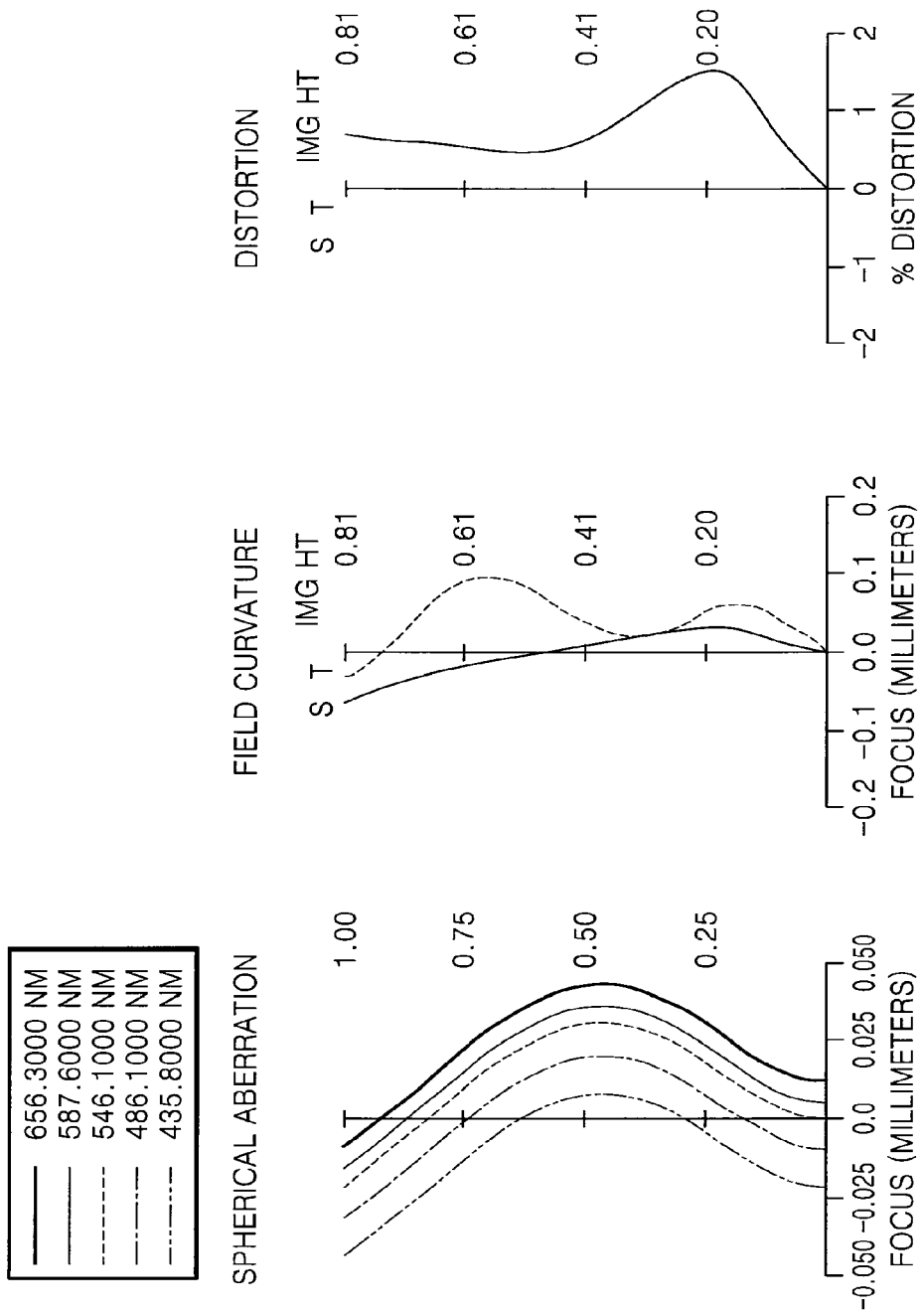
FIG. 4 is a diagram showing a spherical aberration, a field curvature, and a distortion aberration of the imaging optical system shown in FIG. 3.

FIG. 4 shows a spherical aberration, a field curvature, and a distortion aberration of the imaging optical system according to the second embodiment of the present invention.

Third Embodiment

Figure 5:
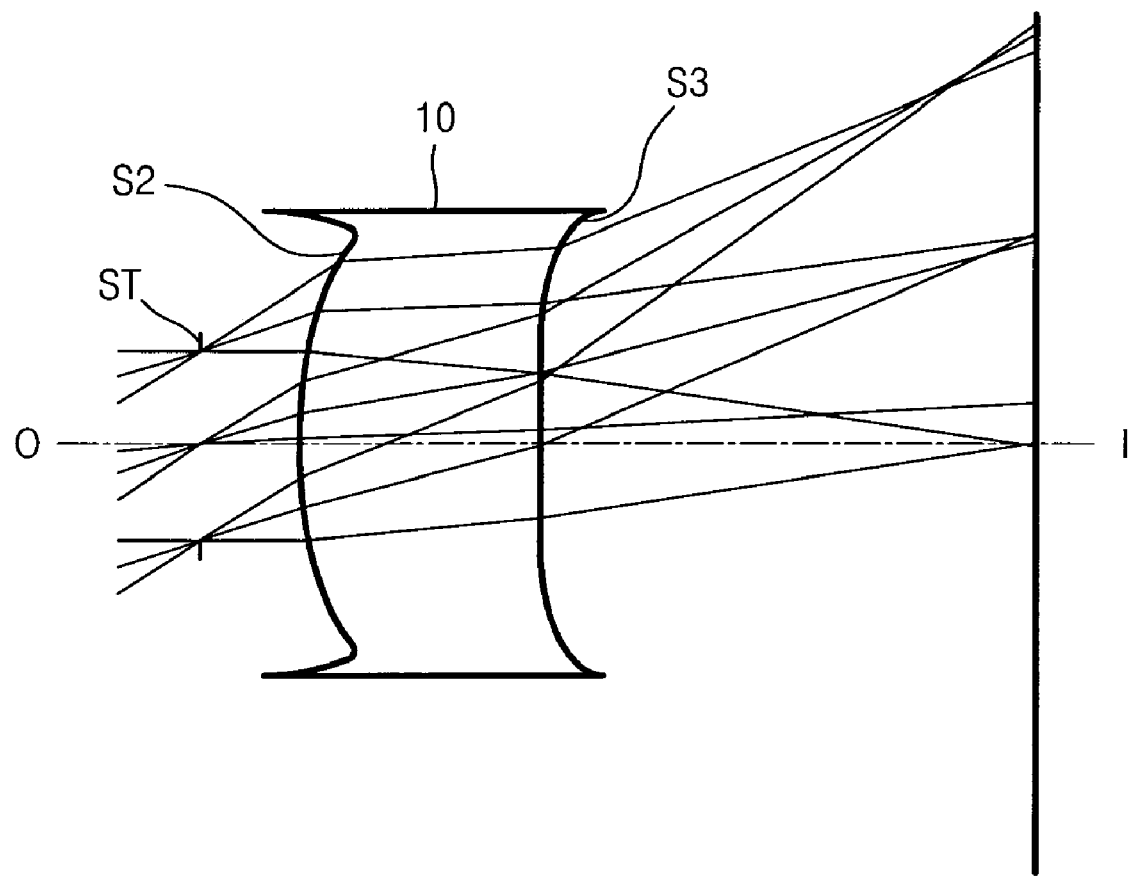
FIG. 5 is a diagram showing an imaging optical system for an image sensor according to another embodiment of the present invention.

FIG. 5 shows a imaging optical system according to a third embodiment of the present invention.

| f: 1.27 Fno: 3.2 ω: 32.66 | | | |
|---|---|---|---|
| R | Dn | nd | vd |
| OB: INFINITY | INFINITY | | |
| ST: INFINITY | 0.195000 | | |
| S2: 0.93000 | 0.500000 | 1.633 | 50.3 |
| ASP: | | | |
| K: 1.663684 | | | |
| A: −.746585E−01 | B: 0.328027E+02 | C: −.710407E+03 | |
| D: 0.599582E+04 | E: 0.431900E+03 | F: −.326557E+06 | |
| G: 0.157794E+07 | H: 0.604628E+06 | J: −.125880E+08 | |
| S3: −5.16564 | 0.299799 | | |
| ASP: | | | |
| K: −15564.71781 | | | |
| A: −.663127E+00 | B: 0.395772E+02 | C: −.323673E+03 | |
| D: 0.715367E+03 | E: 0.436288E+04 | F: 0.347210E+03 | |
| G: −.152467E+06 | H: −.484282E+05 | J: 0.199846E+07 | |
| S4: INFINITY | 0.300006 | | |
| S5: INFINITY | 0.412668 | | |
| IMG: INFINITY | 0.000000 | | |

Figure 6:
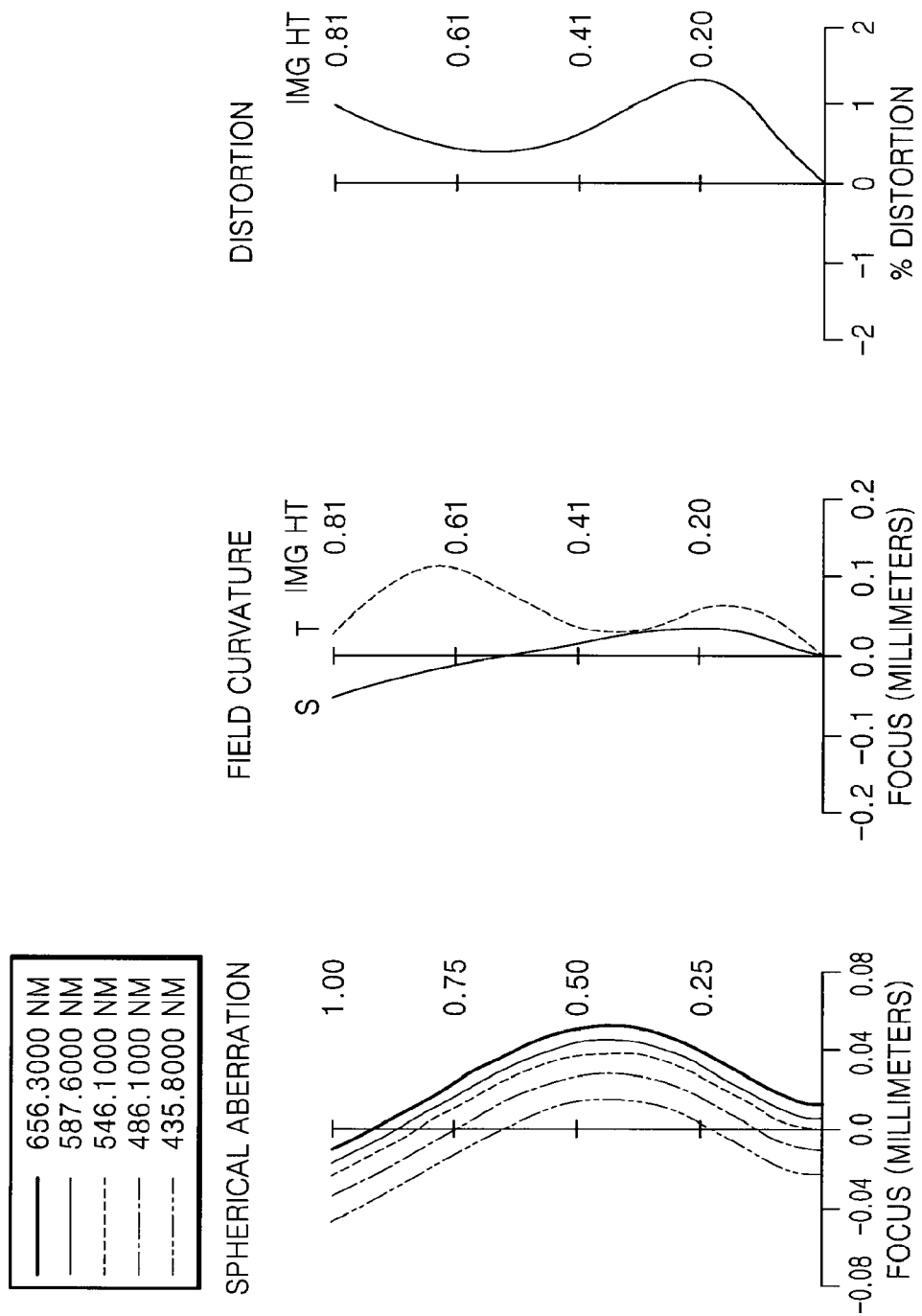
FIG. 6 is a diagram showing a spherical aberration, a field curvature, and a distortion aberration of the imaging optical system shown in FIG. 5.

FIG. 6 a spherical aberration, a field curvature, and a distortion aberration of the imaging optical system according to the third embodiment of the present invention.

Fourth Embodiment

Figure 7:
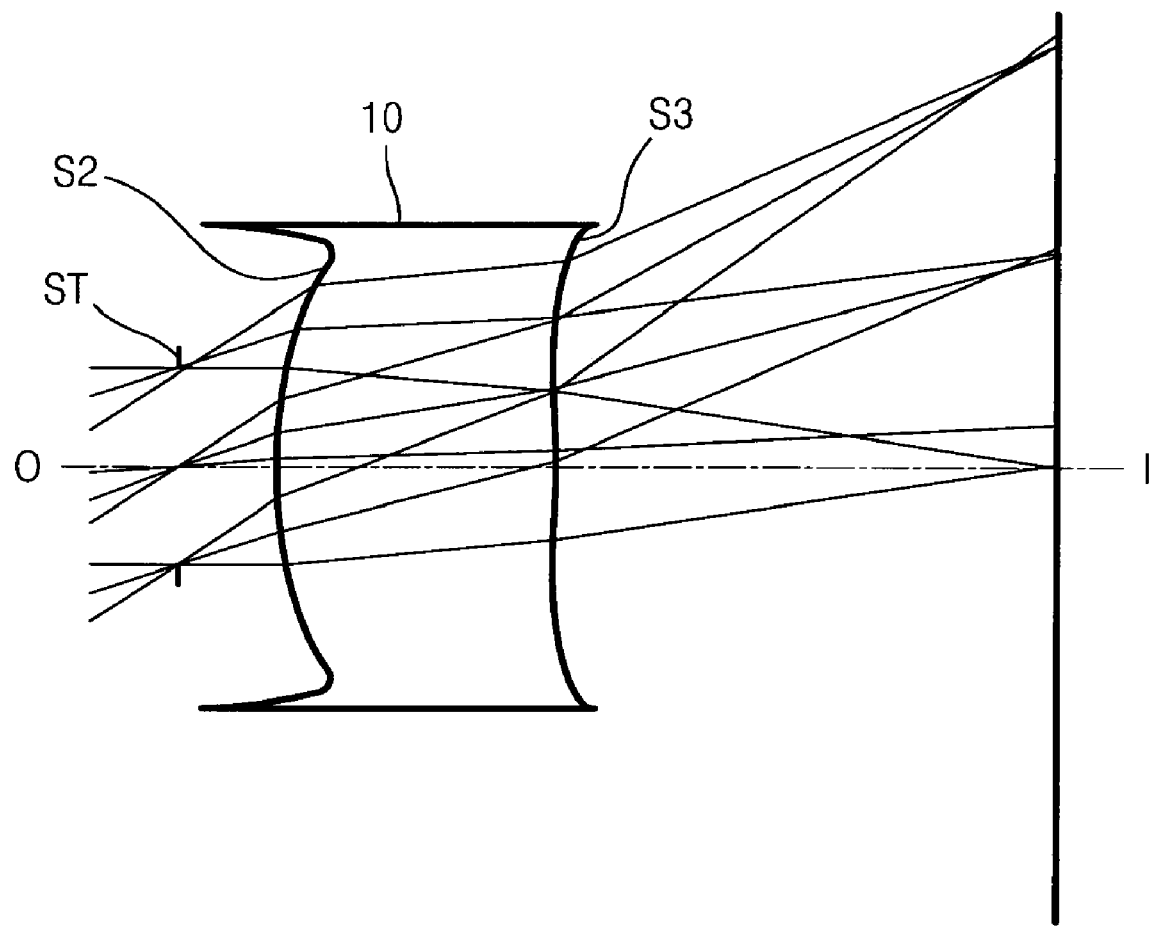
FIG. 7 is a diagram showing an imaging optical system for an image sensor according to another embodiment of the present invention.
Figure 8:
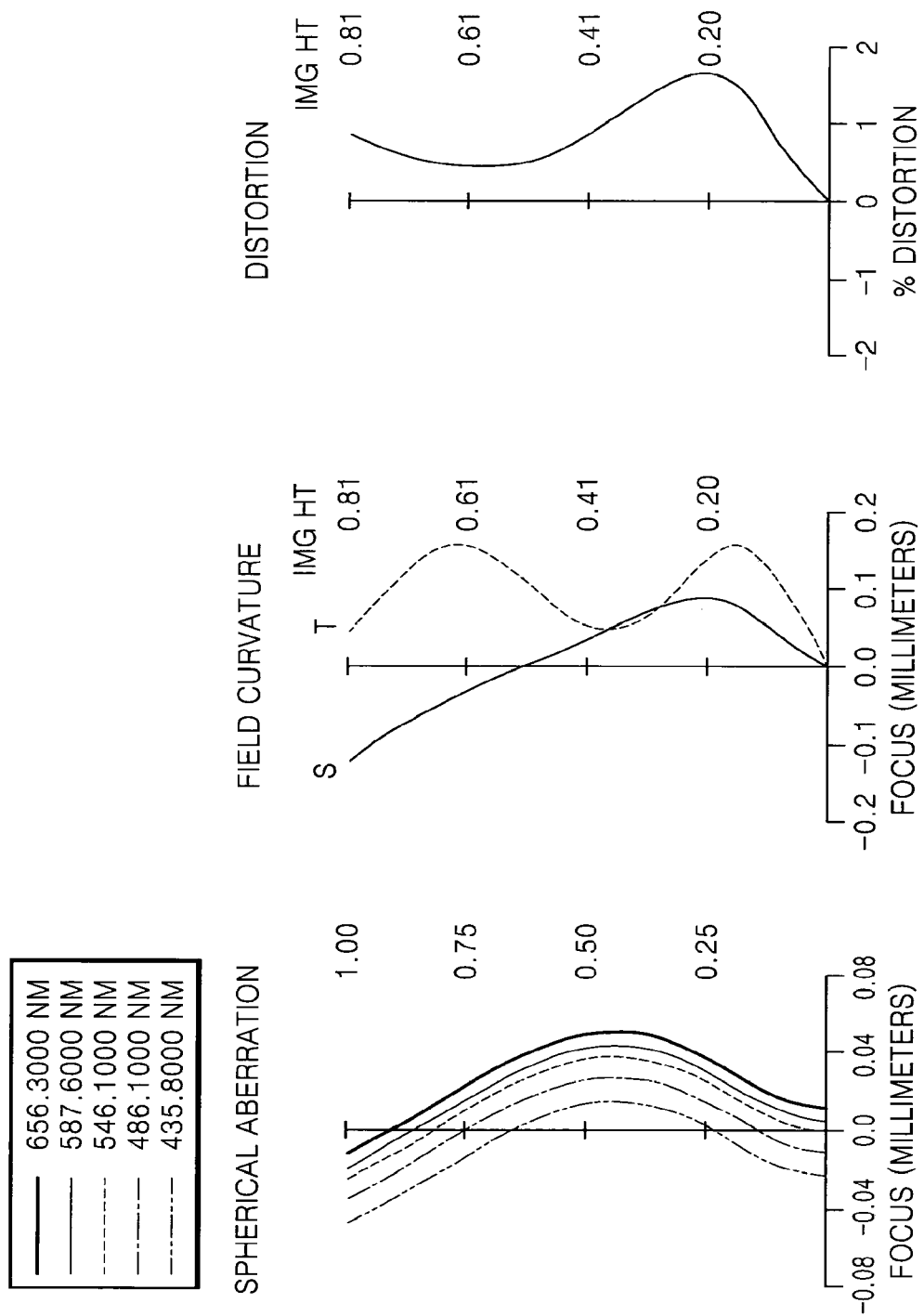
FIG. 8 is a diagram showing a spherical aberration, a field curvature, and a distortion aberration of the imaging optical system shown in FIG. 7.

FIG. 7 shows a imaging optical system according to a fourth embodiment of the present invention.

| f: 1.27 Fno: 3.2 ω: 32.59 | | | |
|---|---|---|---|
| R | Dn | nd | vd |
| ST: INFINITY | 0.195000 | | |
| S2: 0.96733 | 0.550000 | 1.633 | 50.3 |
| ASP: | | | |
| K: 0.566428 | | | |
| A: 0.248485E+00 | B: 0.265104E+02 | C: −.620501E+03 | |
| D: 0.559185E+04 | E: −.976085E+03 | F: −.313401E+06 | |
| G: 0.161535E+07 | H: 0.287318E+06 | J: −.125880E+08 | |
| S3: −3.81306 | 0.299797 | | |
| ASP: | | | |
| K: −6174.550710 | | | |
| A: −.112160E+01 | B: 0.379257E+02 | C: −.280464E+03 | |
| D: 0.610074E+03 | E: 0.315165E+04 | F: −.432053E+02 | |
| G: −.125361E+06 | H: 0.174929E+06 | J: 0.762382E+06 | |
| S4: INFINITY | 0.300004 | | |
| S5: INFINITY | 0.389485 | | |
| IMG: INFINITY | 0.000000 | | |

Fifth Embodiment

Figure 9:
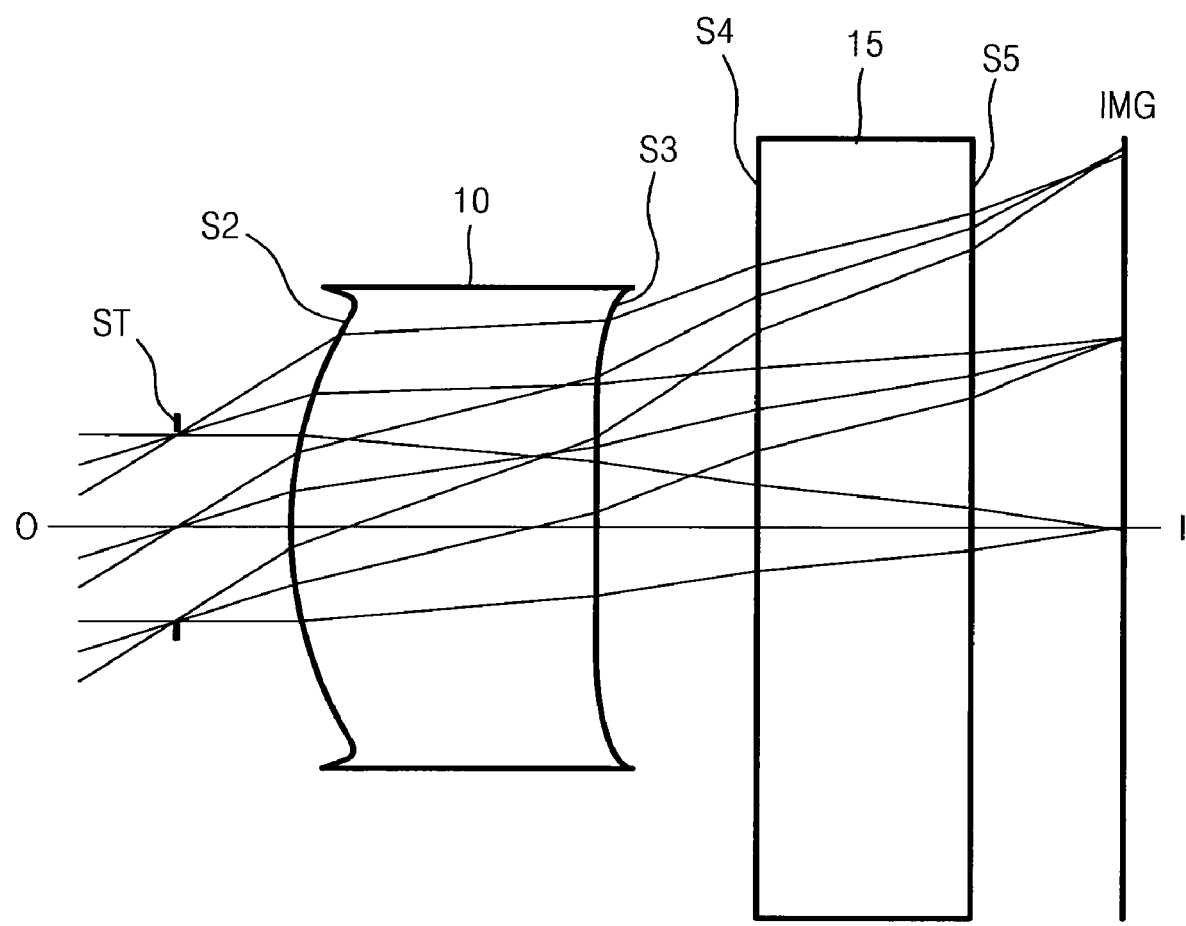
FIG. 9 is a diagram showing an imaging optical system for an image sensor according to another embodiment of the present invention.
Figure 10:
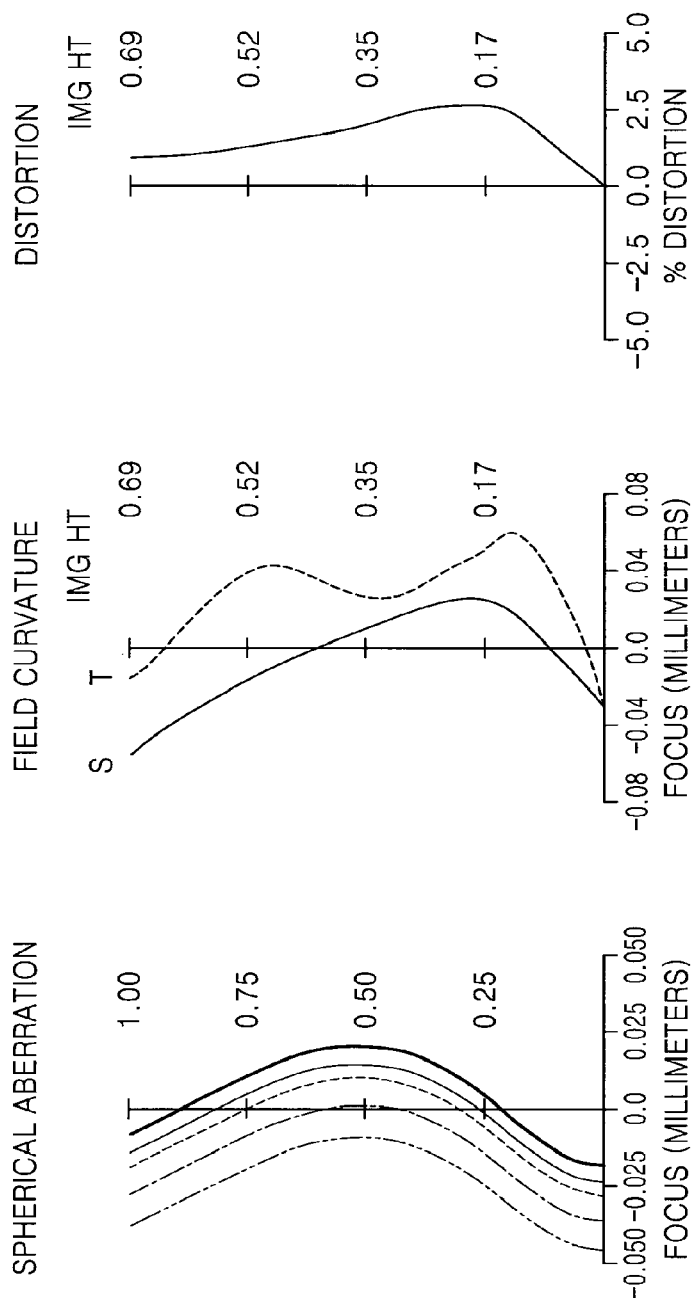
FIG. 10 is a diagram showing a spherical aberration, a field curvature, and a distortion aberration of the imaging optical system shown in FIG. 9.

FIG. 9 shows a imaging optical system according to a fifth embodiment of the present invention.

| f: 1.10 Fno: 3.2 ω: 31.43 | | | |
|---|---|---|---|
| R | Dn | nd | vd |
| OB: INFINITY | 270 | | |
| ST: INFINITY | 0.218726 | | |
| S2: 0.85099 | 0.570000 | 1.633 | 50.3 |
| ASP: | | | |
| K: 1.032484 | KC: 0 | | |
| A: 0.491165E+00 | B: 0.115285E+02 | C: −0.416617E+03 | |
| D: 0.465358E+04 | | | |
| E: −0.614256E+04 | F: −0.261503E+06 | G: 0.163099E+07 | |
| H: −0.402552E+06 | | | |
| J: −0.125879E+08 | | | |
| S3: −3.03379 | 0.299775 | | |
| K: −5135.702349 | | | |
| A: −0.985649E+00 | B: 0.427563E+02 | C: −0.349721E+03 | |
| D: 0.882636E+03 | | | |
| E: 0.499674E+04 | F: −0.727329E+04 | G: −0.196229E+06 | |
| H: 0.413844E+06 | | | |
| J: 0.119862E+07 | | | |
| S4: INFINITY | 0.400000 | 1.51.6 | 64.1 |
| S5: INFINITY | 0.261004 | | |
| IMG: INFINITY | 0.028051 | | |

Sixth Embodiment

Figure 11:
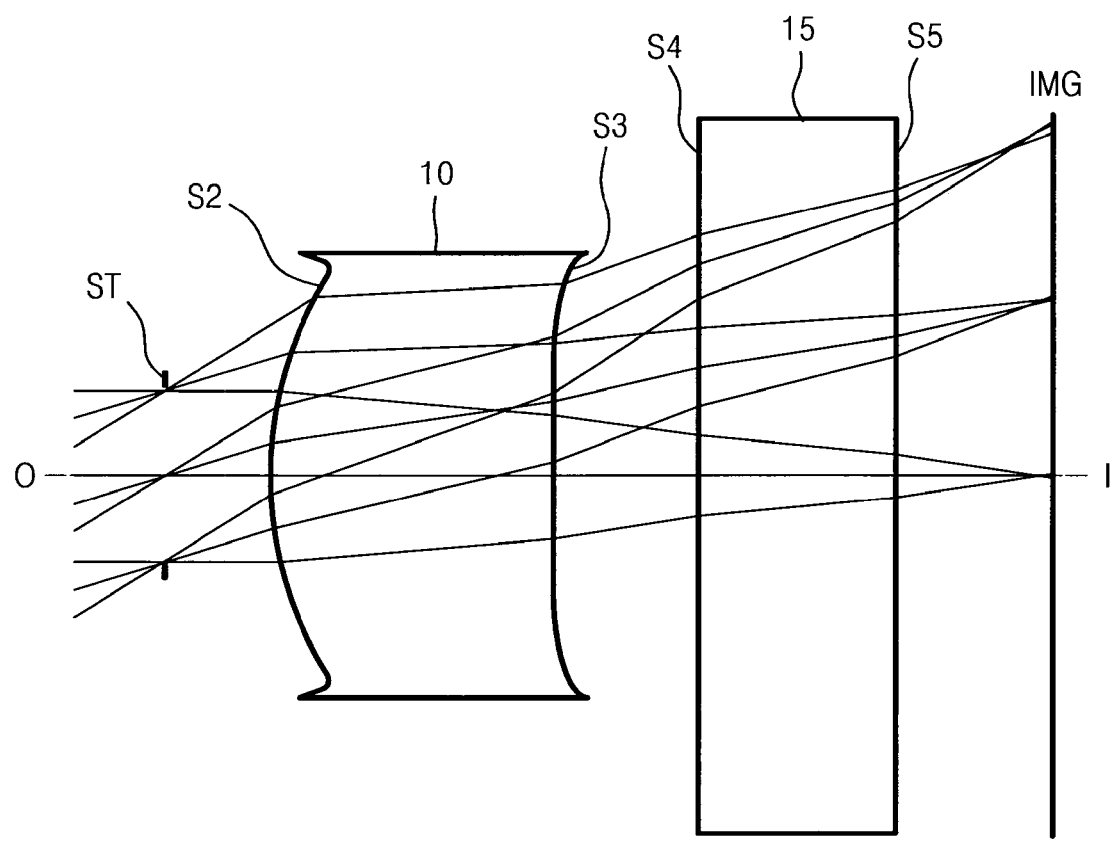
FIG. 11 is a diagram showing an imaging optical system for an image sensor according to another embodiment of the present invention.
Figure 12:
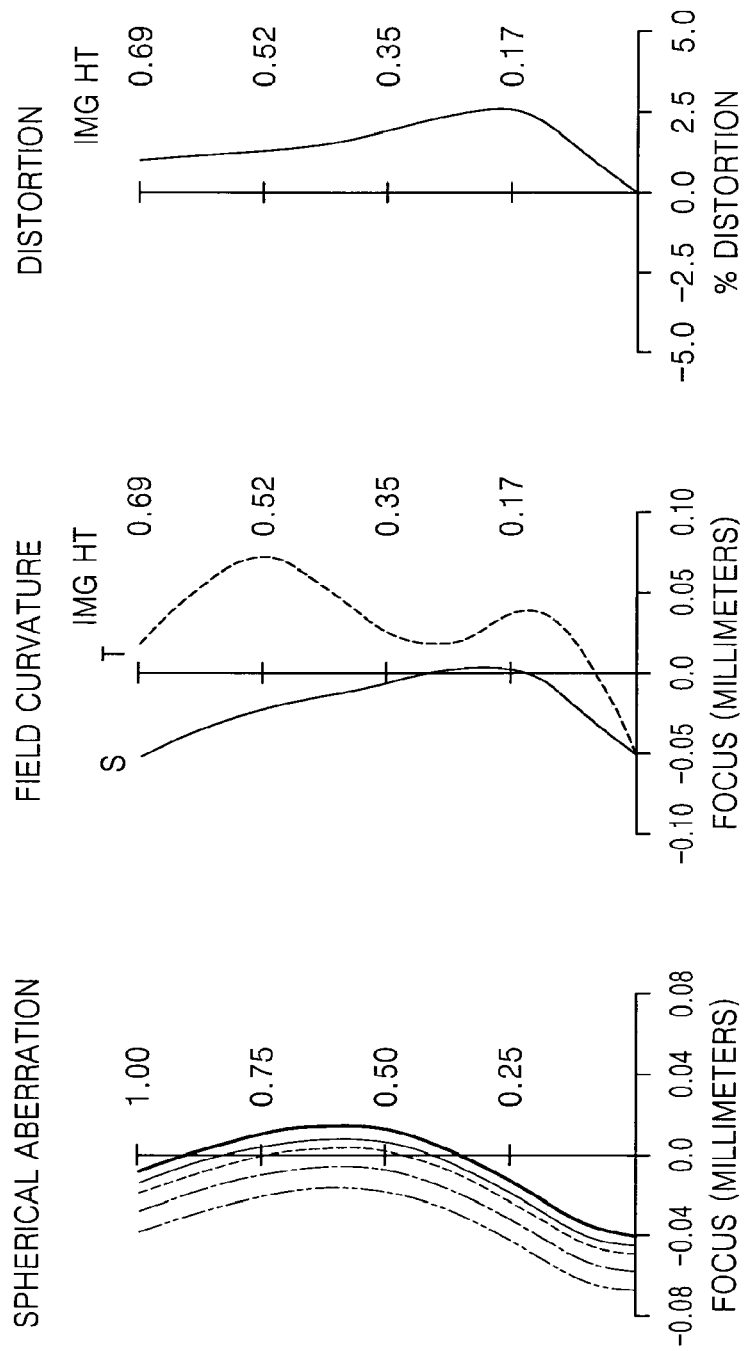
FIG. 12 is a diagram showing a spherical aberration, a field curvature, and a distortion aberration of the imaging optical system shown in FIG. 11.

FIG. 11 shows a imaging optical system according to a sixth embodiment of the present invention.

| f: 1.11 Fno: 3.2 ω: 30.82 | | | |
|---|---|---|---|
| R | Dn | nd | vd |
| OBJ: INFINITY | 270 | | |
| ST: INFINITY | 0.220000 | | |
| S2: 0.84805 | 0.570000 | 1.633 | 50.3 |

| ASP: | | |
|---|---|---|
| K: 0.987438 | | |
| A: −0.227682E+00 | B: 0.269446E+02 | C: −0.553723E+03 |
| D: 0.501135E+04 | | |
| E: −0.564306E+04 | F: −0.260394E+06 | G: 0.165803E+07 |
| H: −0.660896E+06 | | |
| J: −0.125880E+08 | | |

| S3: −3.24458 | 0.299732 | | |
|---|---|---|---|

| ASP: | | |
|---|---|---|
| K: −6326.496189 | | |
| A: −0.991783E+00 | B: 0.429792E+02 | C: −0.360441E+03 |
| D: 0.941484E+03 | | |
| E: 0.500918E+04 | F: −0.790261E+04 | G: −0.197444E+06 |
| H: 0.422726E+06 | | |
| J: 0.119995E+07 | | |

| S4: INFINITY | 0.400000 | 1.51.6 | 64.1 |
|---|---|---|---|
| S5: INFINITY | 0.267140 | | |
| IMG: INFINITY | 0.049386 | | |

Seventh Embodiment

Figure 13:
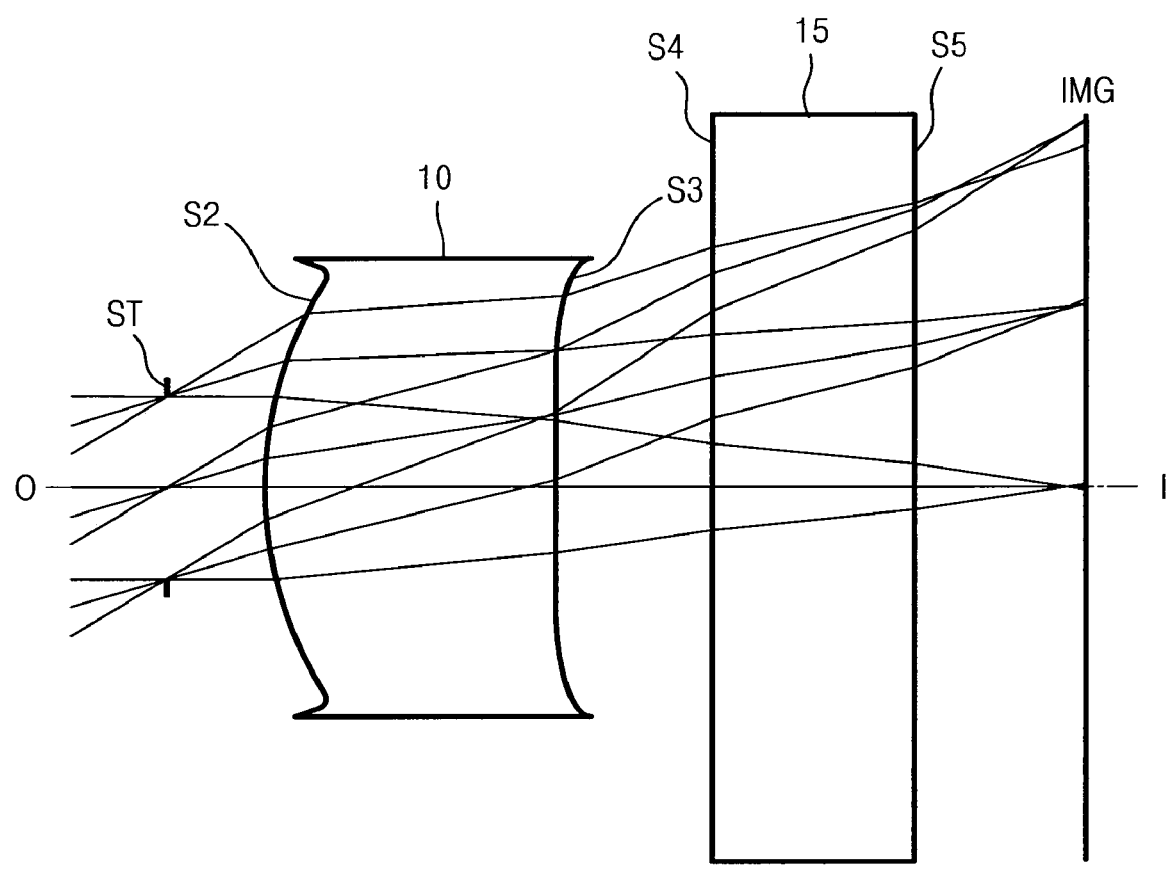
FIG. 13 is a diagram showing an imaging optical system for an image sensor according to another embodiment of the present invention.
Figure 14:
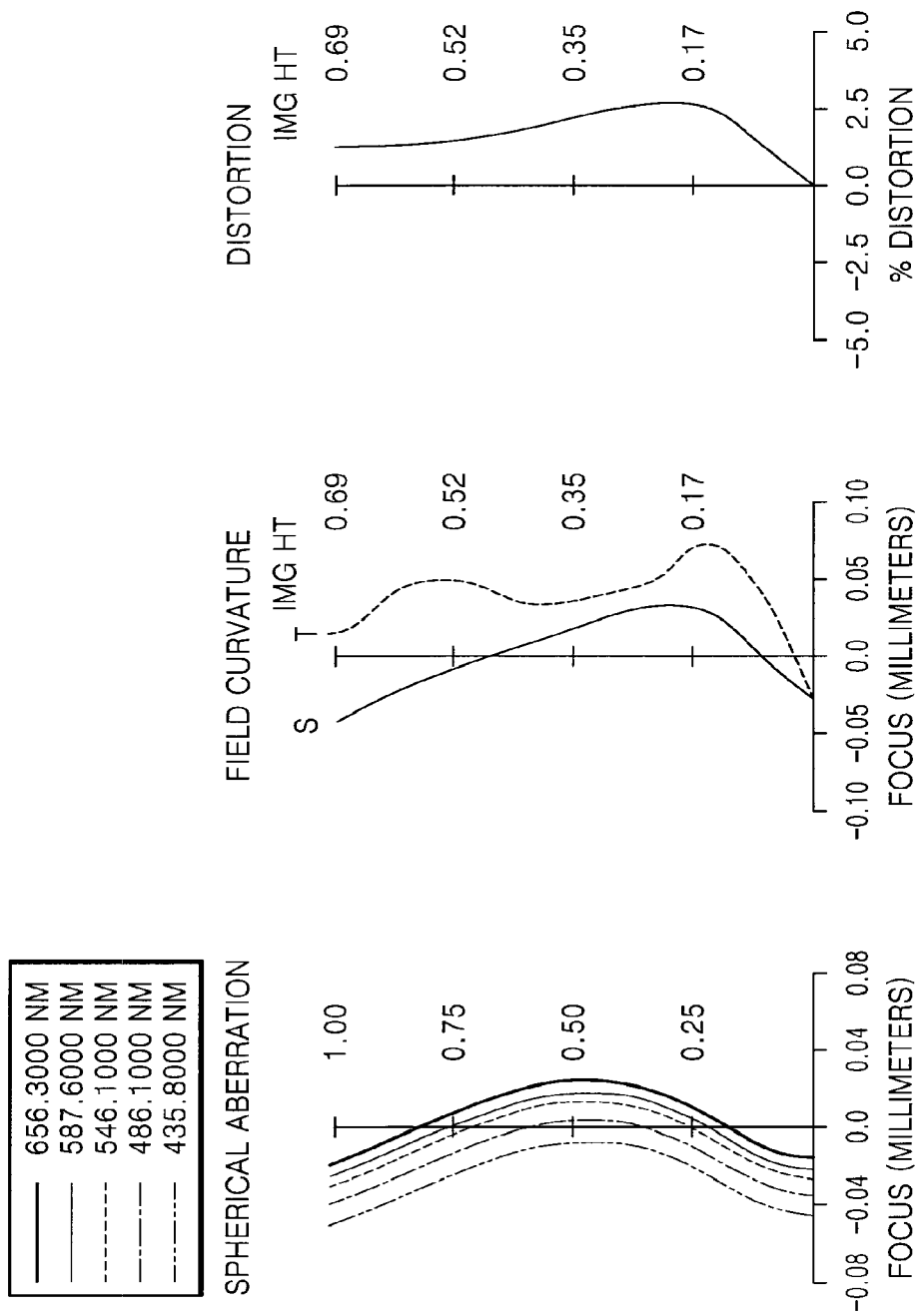
FIG. 14 is a diagram showing a spherical aberration, a field curvature, and a distortion aberration of the imaging optical system shown in FIG. 13.

FIG. 13 shows a imaging optical system according to a seventh embodiment of the present invention.

| f: 1.14 Fno: 3.2 ω: 30.82 | | | |
|---|---|---|---|
| R | Dn | nd | vd |
| OBJ: INFINITY | 270 | | |
| ST: INFINITY | 0.193511 | | |
| S2: 0.88679 | 0.570000 | 1.633 | 50.3 |

| ASP: | | |
|---|---|---|
| K: 2.125523 | | |
| A: 0.540982E+00 | B: 0.858122E+01 | C: −0.404062E+03 |
| D: 0.463537E+04 | | |
| E: −0.594570E+04 | F: −0.261292E+06 | G: 0.162845E+07 |
| H: −0.407364E+06 | | |
| J: −0.125847E+08 | | |

| S3: −3.12738 | 0.299802 | | |
|---|---|---|---|

| ASP: | | |
|---|---|---|
| K: −5931.325504 | | |
| A: −0.990370E+00 | B: 0.426861E+02 | C: −0.357207E+03 |
| D: 0.956921E+03 | | |
| E: 0.488811E+04 | F: −0.834054E+04 | G: −0.200595E+06 |
| H: 0.420883E+06 | | |
| J: 0.144954E+07 | | |

| S4: INFINITY | 0.400000 | 1.51.6 | 64.1 |
|---|---|---|---|
| S5: INFINITY | 0.304211 | | |
| IMG: INFINITY | 0.026403 | | |

Eighth Embodiment

Figure 15:
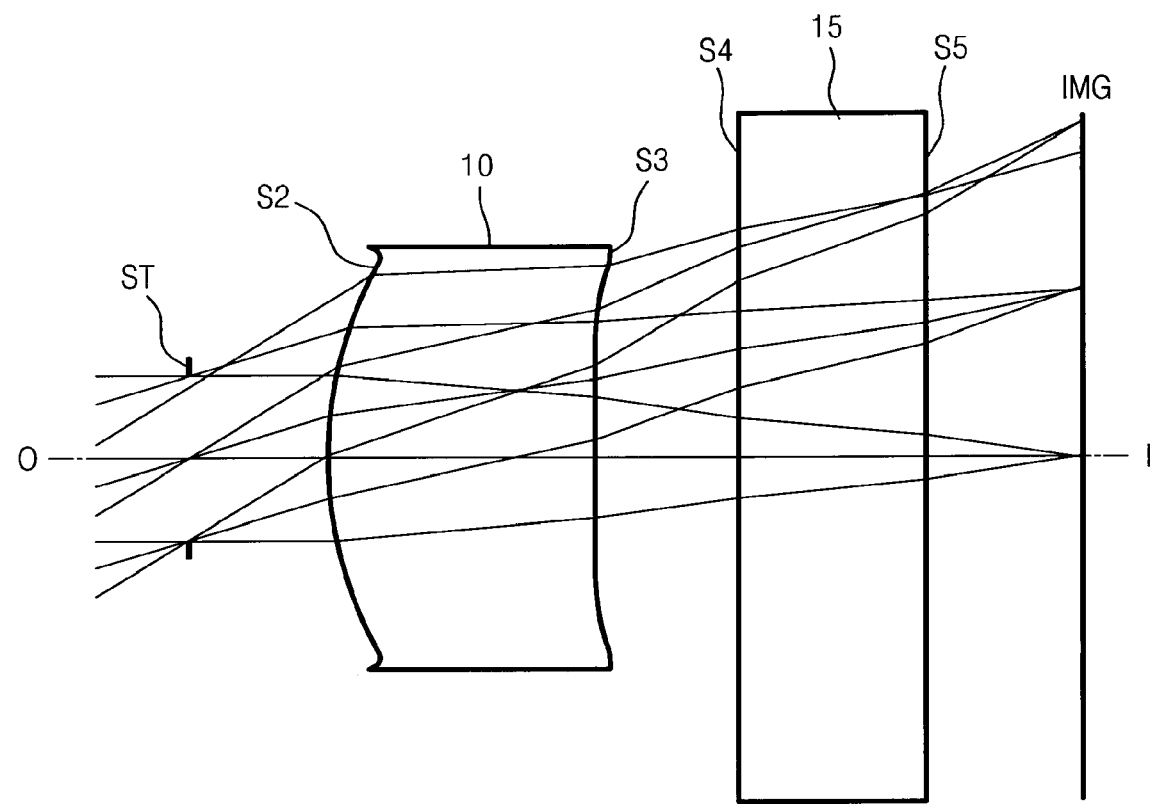
FIG. 15 is a diagram showing an imaging optical system for an image sensor according to another embodiment of the present invention.
Figure 16:
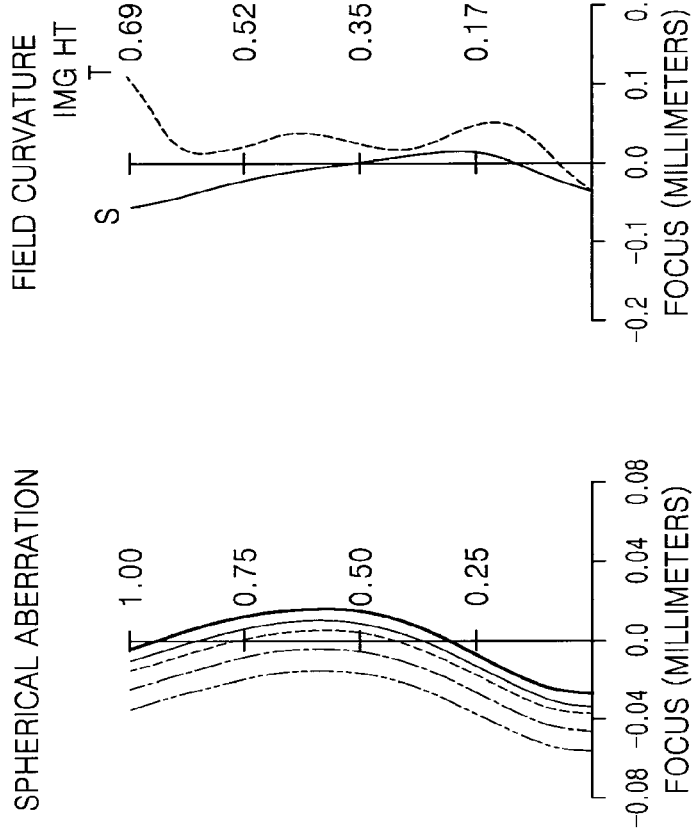
FIG. 16 is a diagram showing a spherical aberration, a field curvature, and a distortion aberration of the imaging optical system shown in FIG. 15.

FIG. 15 shows a imaging optical system according to an eighth embodiment of the present invention.

| f: 1.14 Fno: 3.2 ω: 30.89 | | | |
|---|---|---|---|
| R | Dn | nd | vd |
| OBJ: INFINITY | 270 | | |
| ST: INFINITY | 0.293905 | | |
| S2: 0.88548 | 0.570000 | 1.633 | 50.3 |

| ASP: | | |
|---|---|---|
| K: 0.996648 | | |
| A: 0.927111E−01 | B: 0.171658E+02 | C: −0.445747E+03 |
| D: 0.478047E+04 | | |
| E: −0.608557E+04 | F: −0.264663E+06 | G: 0.160527E+07 |
| H: −0.505911E+06 | | |
| J: −0.107536E+08 | | |

| S3: −3.00000 | 0.299802 | | |
|---|---|---|---|

| ASP: | | |
|---|---|---|
| K: −3620.570929 | | |
| A: −0.126059E+01 | B: 0.422337E+02 | C: −0.348512E+03 |
| D: 0.889156E+03 | | |
| E: 0.489795E+04 | F: −0.591495E+04 | G: −0.182394E+06 |
| H: 0.432330E+06 | | |
| J: 0.302284E+06 | | |

| S4: INFINITY | 0.400000 | 1.51.6 | 64.1 |
|---|---|---|---|
| S5: INFINITY | 0.296365 | | |
| IMG: INFINITY | 0.036783 | | |

The following table shows that the imaging optical systems according to the first through eighth embodiments respectively satisfy the inequalitys 1-6.

TABLE 1

| | Inequality 1 | Inequality 2 | Inequality 3 | Inequality 4 | Inequality 5 | Inequality 6 |
|---|---|---|---|---|---|---|
| Embodiment 1 | 1.120 | 1.226 | 1.126 | 0.195 | 0.793 | 0.444 |
| Embodiment 2 | 1.141 | 1.265 | 1.122 | 0.195 | 0.796 | 0.507 |
| Embodiment 3 | 1.136 | 1.190 | 1.128 | 0.195 | 0.732 | 0.393 |
| Embodiment 4 | 1.122 | 1.215 | 1.126 | 0.195 | 0.761 | 0.433 |
| Embodiment 5 | 1.130 | 1.406 | 1.139 | 0.218 | 0.767 | 0.514 |
| Embodiment 6 | 1.122 | 1.419 | 1.138 | 0.220 | 0.758 | 0.510 |
| Embodiment 7 | 1.133 | 1.391 | 1.120 | 0.193 | 0.771 | 0.495 |
| Embodiment 8 | 1.153 | 1.406 | 1.183 | 0.293 | 0.776 | 0.500 |

The embodiments of the imaging optical system for the image sensor according to the present invention can be applied to a camera, and moreover, can be used in a video telephony call system. When the imaging optical system is used for video telephony call system, the first lens 10 is formed using a glass having the IR cut-off function in order to maintain the wide viewing angle and improve the yield. Then, the additional IR cut-off filter is not necessary. When the first lens 10 is fabricated using the glass having the IR cut-off function, the camera module can be coupled to the PCB using a reflow process, and moreover, transmittance and spectral characteristics of the light are constant regardless of the incident angle of the light. Brightness deviation and chromatic aberration in the image are thereby decreased. In addition, when the general IR cut-off filter is used, the radio frequency components affect the image sensor, and thus, Moire patterns may be generated in the image. However, in the present invention, the high frequency components are blocked by an optical low pass filter material to prevent generation of the Moire pattern.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An imaging optical system for an image sensor, the imaging optical system comprising:
    a stop and a first lens sequentially arranged from an object side,
    wherein the first lens has aspherical surfaces on both sides and has a positive refractive power, a first surface of the first lens which faces the object side is a convex surface and a second surface of the first lens which faces an image side is a convex surface, and the imaging optical system satisfies the following inequality, $1.0 < C_T/E_T < 1.4$, where $C_T$ denotes a thickness of the first lens on a center portion of the first lens, and $E_T$ denotes a thickness of the first lens on an edge portion of an effective aperture of the first lens.

2. The imaging optical system of claim 1, wherein the following inequalities are satisfied:

$1.1 < L_B/f < 1.5$ $1.0 < L_T/L_B < 1.4$, where $L_T$ represents a distance along an optical axis from a surface of the stop facing the object side to an image surface, f represents an entire focal distance of the focusing optics, and $L_B$ represents a distance along the optical axis from the first surface to the image surface.

3. The imaging optical system of claim 1, wherein the following inequality is satisfied:

$0.18 \leq S \leq 0.3$, where S denotes a distance of the optical axis from the stop to the first surface of the first lens.

4. The imaging optical system of claim 1, wherein the following inequality is satisfied:

$$0.5 < \frac{|R_1|}{f} < 0.9,$$

where $R_1$ denotes a curvature of the first surface of the first lens, and f denotes the entire focal distance of the focusing optics.

5. The imaging optical system of claim 1, wherein the following inequality is satisfied:

$0.35 < C_T/f < 0.57$, where $C_T$ denotes a thickness of a center portion of the first lens, and f denotes the entire focal distance of the focusing optics.

6. The imaging optical system of claim 1, wherein the first lens is formed from an infrared absorbing glass.

* * * * *